P. HEDIN.
REPAIRING DEVICE.
APPLICATION FILED MAR. 8, 1921.

1,388,815. Patented Aug. 23, 1921.

Inventor
Peter Hedin.
Geo Stevens,
Attorney

UNITED STATES PATENT OFFICE.

PETER HEDIN, OF DULUTH, MINNESOTA.

REPAIRING DEVICE.

1,388,815. Specification of Letters Patent. Patented Aug. 23, 1921.

Application filed March 8, 1921. Serial No. 450,600.

*To all whom it may concern:*

Be it known that I, PETER HEDIN, a citizen of the United States, residing at Duluth, in the county of St. Louis and State of Minnesota, have invented certain new and useful Improvements in Repairing Devices, of which the following is a specification, reference being had therein to the accompanying drawing.

This invention relates to a repairing device and has special reference to means for the repair by soldering of metal receptacles such as household hot water tanks or the like.

The principal object of the invention is to provide simple and convenient means whereby such soldering or repairing may be accomplished without dismantling or interfering with the installation of the receptacle.

Another object is to provide such a device which may be easily applied and operated by any person with ordinary skill.

Other objects and advantages will appear in the further description of the invention.

Referring to the accompanying drawing forming part of this application and in which like reference characters indicate like parts:

Figure 1:
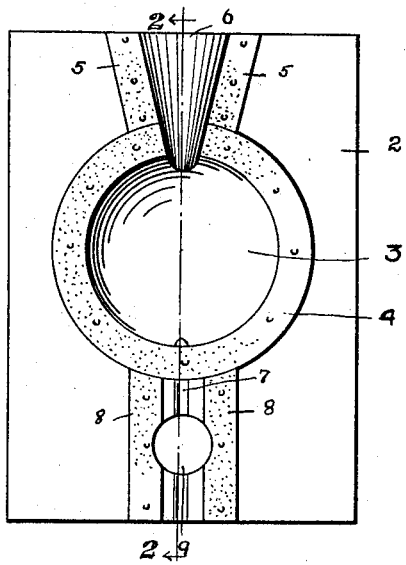
Figure 1 is a front elevation of the principal body portion of the device.
Figure 2:
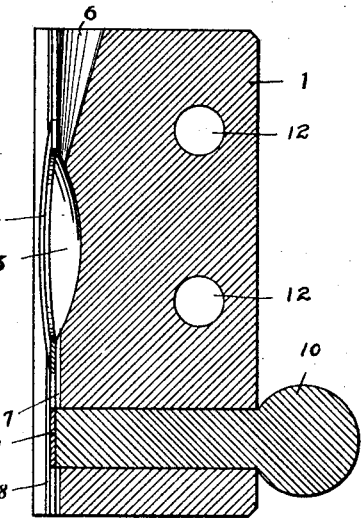
Fig. 2 is a central vertical section on the line 2—2 Fig. 1.
Figure 3:
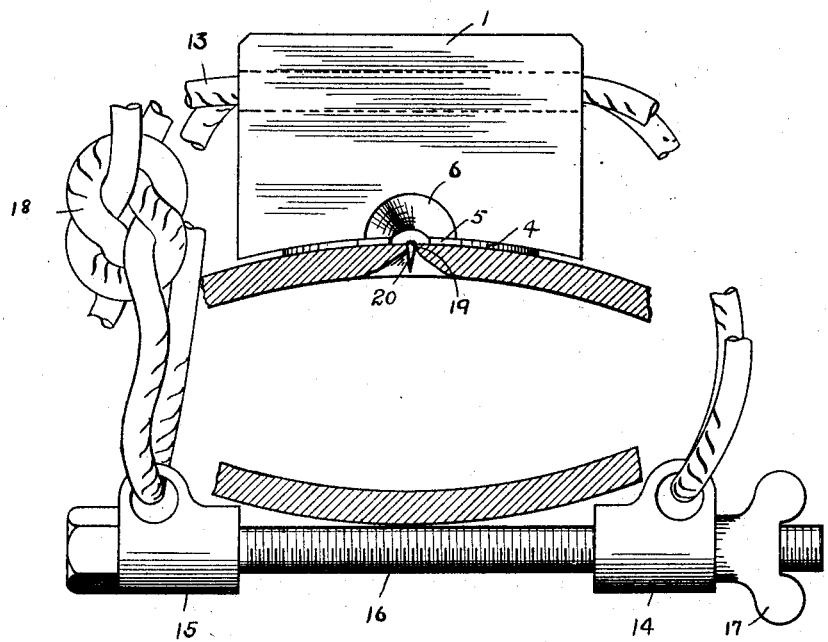
Fig. 3 is a broken top plan view of the device illustrating the manner in which it is applied to a tank or receptacle.

1 represents the body portion of the device which is preferably composed of a rectangularly shaped piece of wood, one face 2 of which is made concaved transverse the block. Centrally of this concaved surface is a deeper circularly concaved portion 3 which is surrounded, except at its extreme uppermost ends, by a flat rubber gasket 4. The upper ends of this gasket are spaced apart and have diverging branch like pieces of gasket 5 abutting therewith upon their circumferential edges, thus forming a V-shaped entrance, as it were, to the concaved portion 3. The face of the block 1 is cut away conically opposite this V-shaped opening, as at 6 forming the gate to the concaved portion 3.

Directly beneath the gate 6 and inside of the gasket 4 is a channel or groove 7 formed in the face 2 of the block and which groove extends from the concaved portion 3 to the lower edge of the block, this being for the purpose of discharging the soldering material during the initial operation of the device, the object of which will be described later.

Upon either side of the groove or slot 7 are placed pieces of rubber gasket 8 the same thickness and of like material to that of the gasket 4, they being for the purpose of confining the discharging material.

Within this slot 7 and through the block 1 is formed a hole 9 in which is manually inserted the block 10, said block having a rubber tip 11 on the end thereof which corresponds in thickness to the gaskets 8.

For holding the block in position against an object being soldered or patched, the block 1 is provided with two spaced through holes 12 through which a suitable rope 13 is reeved, said rope being designed to pass around the receptacle or boiler being patched, and, upon the opposite side of the boiler, passed through the sliding nuts 14 and 15 mounted upon the bolts 16 and which bolt is provided at one end with a suitable wing nut 17 which may be screwed up against the sliding nut 14, thus forcing the two nuts 14 and 15 toward each other pulling the rope taut, the ends of the latter having been suitably tied previously as at 18.

In operation the hole in the boiler, which is indicated at 19, is first located and the outside surface thereabout suitably cleaned, and, in the event of the boiler being full of water at the time, a wooden plug, indicated at 20, may be driven into the hole to stop the leak. The block 1 is then placed against the boiler with the hole as nearly as possible occurring in the center of the concaved recess 3 when the rope 13 is pulled tightly about the boiler made fast as at 18 and drawn still tighter by the operation of the wing nut 17 in forcing the sliding nuts 14 and 15 toward each other.

The block now having been properly positioned the plug 10 is slightly withdrawn to permit free passage of the soldering material when it is poured into the gate 6 before the desired adhesion takes place. Then the molten solder is poured into the gate 6 and will follow down against the surface to be patched and on out through the channel 7. This pouring of the soldering material through the patch forming device is continued until such time as it is considered that the surface of the boiler about the rupture is sufficiently hot to result in said adhesion of the solder when the plug 11 is forced inwardly against the surface of the boiler thus stopping the discharge of the material. Then as the pouring continues the recess 3 will be completely filled and allowed to remain until cooled off when the patch forming device may be removed resulting in a neat circular convex patch, securely attached over the rupture.

From actual experience with such a device it is found that frequently three or four patches of this kind may be made with one of the devices before it becomes sufficiently burned or injured to render it unuseful, and inasmuch as one such patch may result in the prolongation of the life of a boiler for some considerable time the method is considered an exceptionally profitable and economical advance in the art.

Having thus described my invention, what I claim and desire to secure by Letters Patent, is:

1. A patch forming device of the character described comprising a body block, a concaved portion within one face of the block, a recessed gate within said face leading into said concaved portion through which to deposit soldering material to said portion and means for holding the block tightly against an object being patched.

2. A device of the class described comprising a body block, a concaved portion within one face of the block, means surrounding said portion for forming a tight joint against an object to which the block is applied, a recessed gate in said block through which to deposit soldering material into the concaved portion, a discharge gate for said concaved portion having means for opening and closing said gate and adjustable, yieldable means for holding the body block against the object to be repaired.

3. A patch forming device of the character described comprising a body block, a concaved portion within one face of the block, a recessed filling gate within said face leading into said concaved portion, a recessed discharging gate within said face also communicating with said concaved portion whereby soldering material may be passed through said recessed and concaved portions for initially heating the object to be patched, means for subsequently closing the discharge gate, and means for holding the block tightly against an object being patched.

In testimony whereof I hereunto affix my signature in the presence of two witnesses.

PETER HEDIN.

Witnesses:
S. C. BRONSON,
S. GEO. STEVENS.